Patented July 28, 1931

1,816,152

UNITED STATES PATENT OFFICE

CHAD H. HUMPHRIES, OF INDIANAPOLIS, INDIANA, ASSIGNOR TO JAMES C. PATTEN, OF INDIANAPOLIS, INDIANA

COMPOSITION FOR CADMIUM PLATING BATHS

No Drawing. Application filed September 23, 1927. Serial No. 221,619.

In electrodepositing cadmium on the surface of metallic or other objects for the purpose of rustproofing the same or otherwise improving the surface thereof, a satisfactory and efficient bath consists essentially of an aqueous solution of cadmium sulphate either prepared from the oxide or in any other suitable manner, a certain quantity of free sulphuric acid and a brightening agent such as a glucoside, to which may be added a certain amount of ammonium sulphate. By means of a bath of this character I have been enabled to obtain excellent deposits of metallic cadmium, which are in every way suitable for practical purposes.

The solution must, of course, be made up in a plating tank such as are used in plating shops. The object of the present invention is an improvement or modification of the ingredients or chemicals which are used to make up the above-mentioned acid plating solution so that the same can be packed in a dry form for shipment to electroplaters, in such a manner that the material is supplied to the trade in suitable containers and is ready for immediate use, or can be conveniently stored, if required. When dissolved in water, a mixture of this character will give a cadmium plating bath, which will have in general the characteristics of the above-mentioned bath, and will be maintained and will function in the same manner.

The glucoside, which is one of the ingredients of the above-mentioned bath, serves the purpose of a brightening agent, as it improves the quality of the deposit.

Inasmuch as the cadmium salt which undergoes electrolysis in the above-mentioned bath is cadmium sulphate, I may supply the same in the form of a cadmium compound which when the mixture is dissolved in water, will form the said sulphate with the help of the ingredient or ingredients containing the $SO_4$ radical. Thus for instance I may use cadmium oxide, cadmium hydroxide, cadmium carbonate, cadmium sulphate or chloride or any other cadmium salt which may be found suitable.

I have found the following composition of matter suitable for the purpose indicated:

2½ to 3 oz. cadmium oxide
6 oz. acid sodium sulphate
4 oz. ammonium sulphate
1 to 10 grams glucoside A satisfactory glucoside is a cane sugar caramel.

For the cadmium oxide in the above formula there may be substituted the equivalent quantities of cadmium carbonate. The above quantity is a unit amount to be dissolved in one gallon of water.

The above materials can be mixed dry in a mixing machine and packed in metal containers having a resined lining.

Another formula which I have found suitable for my purpose is as follows:

4 oz. cadmium sulphate
6 oz. ammonium sulphate
1 to 10 grams glucoside

Cadmium chloride may be substituted for the cadmium sulphate in the above mixture.

I claim as my invention:

1. A composition of matter adapted for use in forming an acid solution for the electrodeposition of cadmium, consisting of a dry mixture, comprising a salt having a sulphuric acid radical, a cadmium salt soluble in water in the presence of such radical salt to form cadmium sulphate, ammonium sulphate and a brightening agent.

2. A composition of matter adapted for use in forming an acid solution for the electrodeposition of cadmium, consisting of a dry mixture, comprising cadmium oxide, acid sodium sulphate, ammonium sulphate and a brightening agent.

3. A composition of matter adapted for use in forming an acid solution for the electrodeposition of cadmium consisting of a dry mixture, comprising cadmium oxide, acid sodium sulphate, ammonium sulphate and a glucoside.

4. A composition of matter adapted for use in forming an acid solution for the electrodeposition of cadmium, consisting of a dry mixture, comprising 2½ to 3 oz. cadmium oxide, 6 oz. acid sodium sulphate, 4 oz. ammonium sulphate and 1 to 10 grams of a glucoside.

5. A composition of matter adapted for use in forming an acid solution for the electrodeposition of cadmium consisting of a dry mixture, comprising cadmium oxide, acid sodium sulphate, ammonium sulphate and cane sugar caramel.

6. A composition of matter adapted for use in forming an acid solution for the electrodeposition of cadmium, consisting of a dry mixture, comprising 2½ to 3 oz. cadmium oxide, 6 oz. acid sodium sulphate, 4 oz. ammonium sulphate and 1 to 10 grams of cane sugar caramel.

7. A composition of matter adapted for use in forming an acid solution for the electrodeposition of cadmium, consisting of a dry mixture, comprising cadmium sulphate, ammonium sulphate and cane sugar caramel.

In witness whereof, I, CHAD H. HUMPHRIES, have hereunto set my hand at Indianapolis, Indiana, this 28th day of June, A. D. one thousand nine hundred and twenty-seven.

CHAD H. HUMPHRIES.